United States Patent Office 2,793,281
Patented May 21, 1957

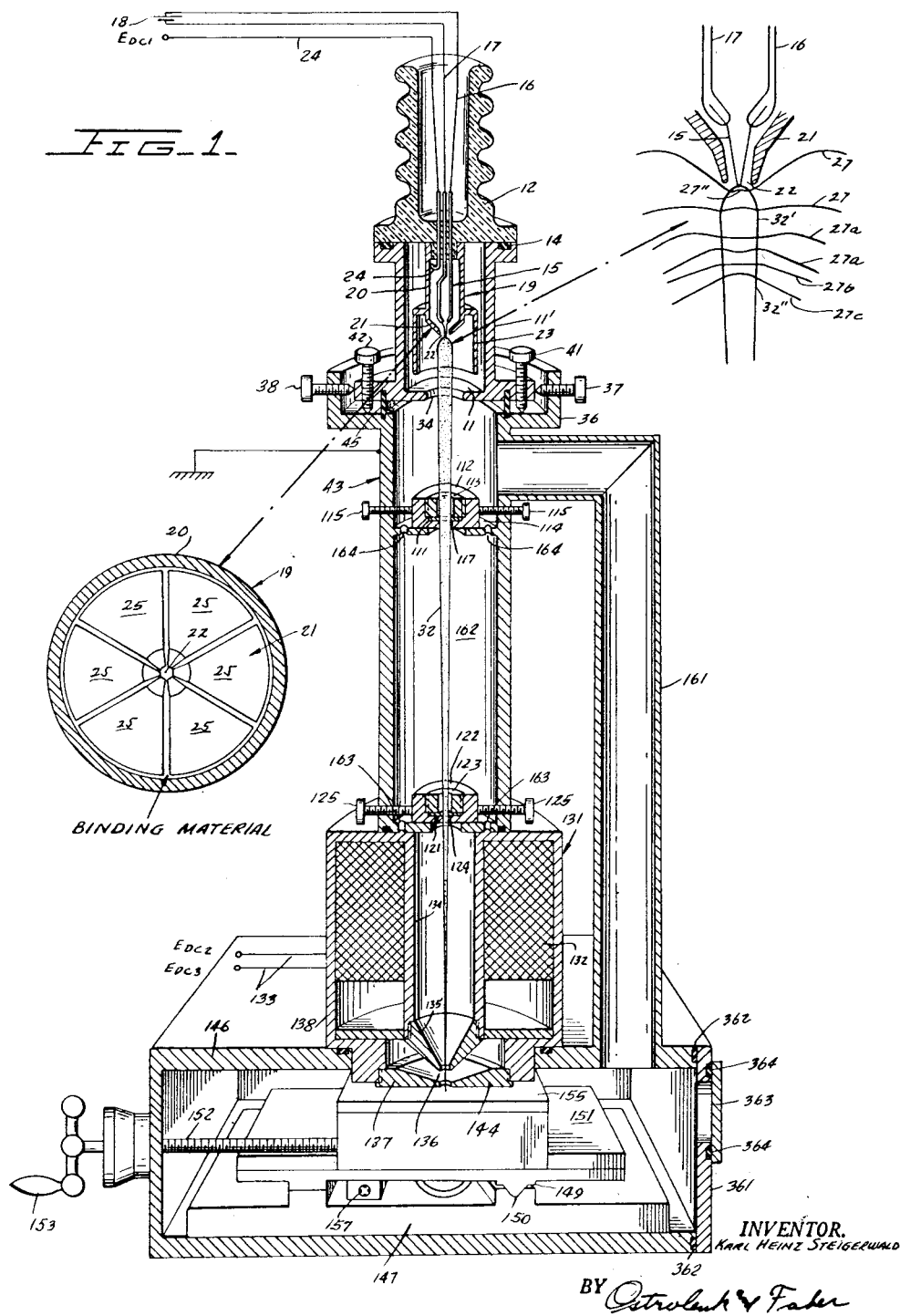

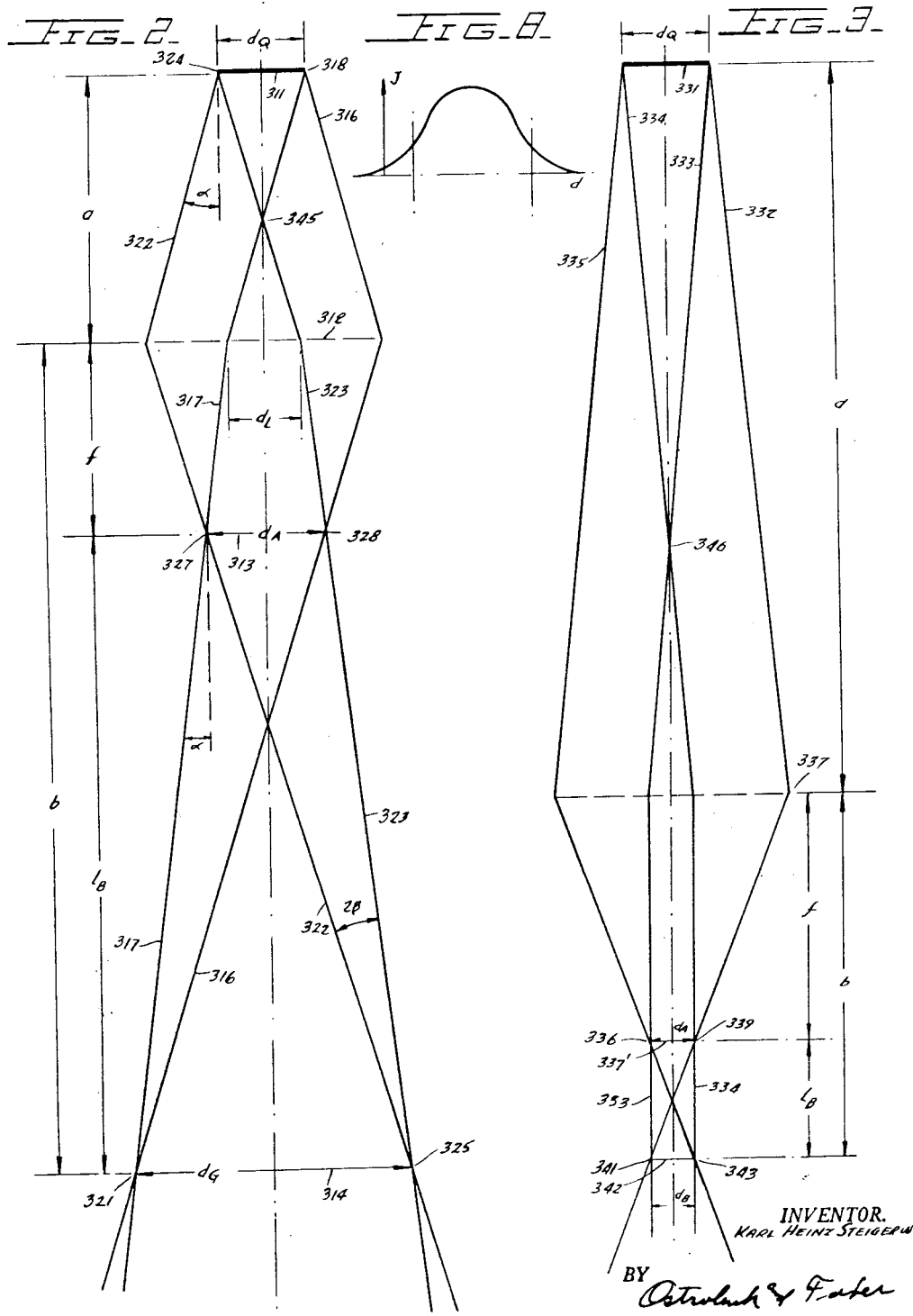

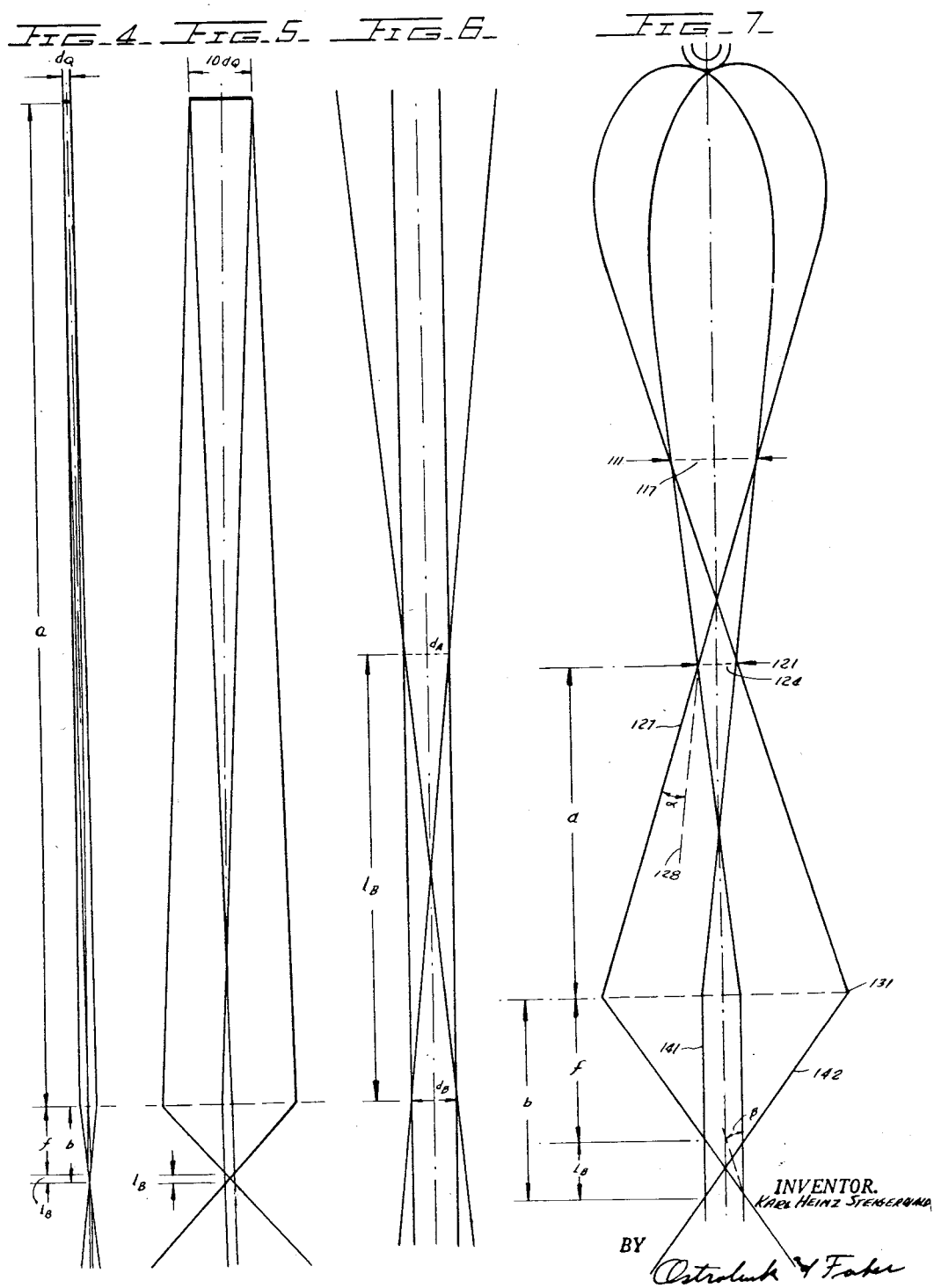

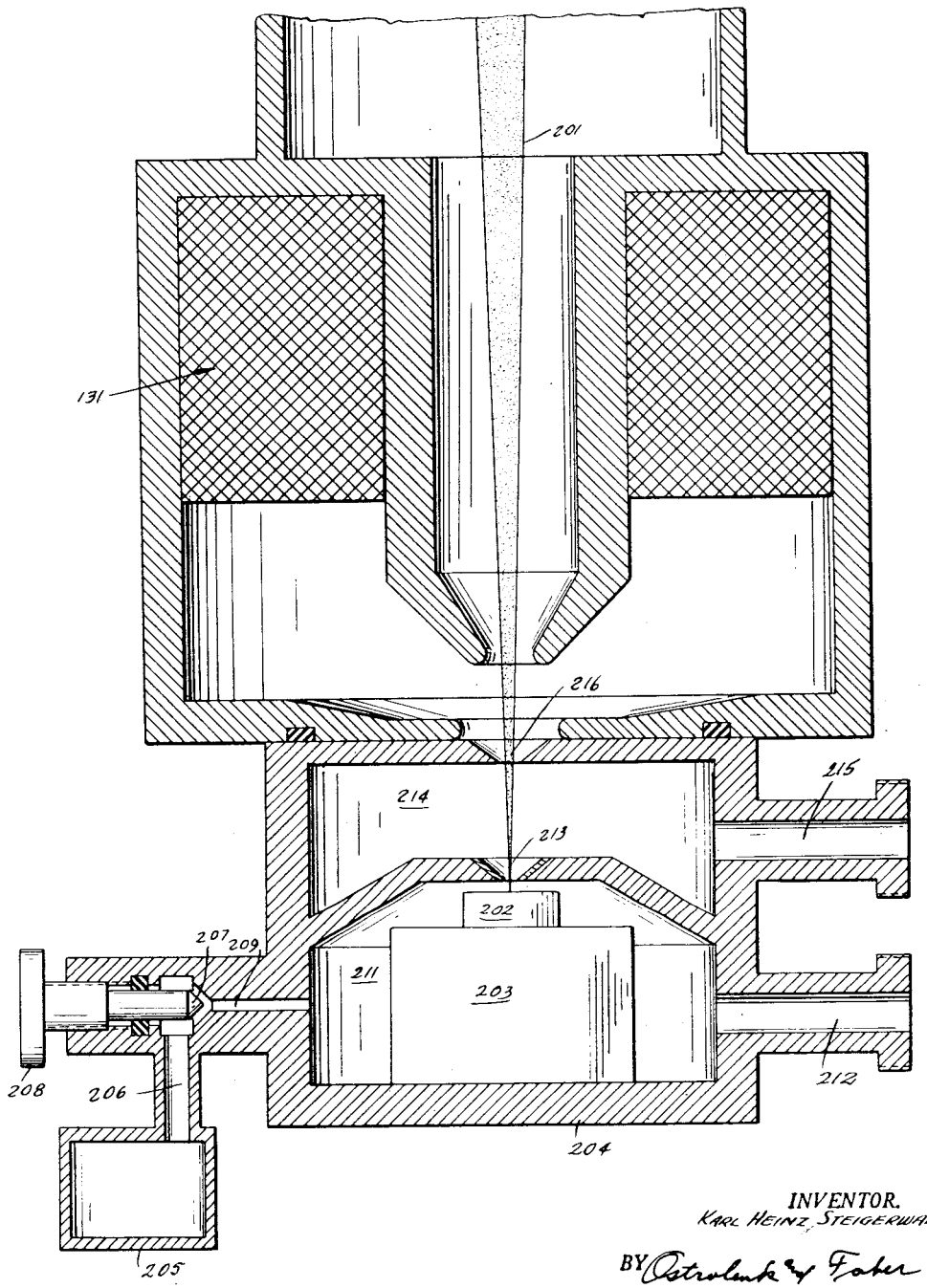

2,793,281
DRILLING BY ELECTRONS

Karl Heinz Steigerwald, Mosbach, Germany, assignor, by mesne assignments, to Carl Zeiss, Heidenheim (Brenz), Wurttemberg, Germany Application November 28, 1951, Serial No. 258,672

Claims priority, application Germany January 31, 1951

12 Claims. (Cl. 219—69)

My invention relates to novel apparatus for and methods of drilling holes and more particularly relates to novel electronic apparatus and methods of using the kinetic energy of an electron beam for drilling fine holes having diameters of the order of 0.1 millimeter.

I have discovered that by a novel arrangement for controlling an electron beam and for focusing the same, I can obtain a concentration of relatively high current density of the electron beam. I can in the order of time of seconds drill holes through objects such as steel and Al₂O₃ to a depth of several millimeters.

In general, my invention contemplates an arrangement of the electron emitter with respect to the control electrode such that the electron beam formed at the emitter has a substantially constant current density over its entire area. An image of the source of the electron beam is produced at some region beyond the electronic control system. By suitable arrangement of diaphragms and focusing means, including control of the area of the image and focusing plane of the electron source, the angle at which the electron beam emanates from the image and the remaining parameters of the optical system, I can control the current density or concentration of the electron stream. This may either be conical in the general case or cylindrical in the specific case for drilling holes of corresponding shapes.

Accordingly, an object of my invention is to provide novel apparatus for and methods of drilling holes.

A further object of my invention is to provide novel apparatus for and methods of drilling holes in hard materials such as steel, stone, glass, tungsten and its carbides, molybdenum and its carbides, diamonds, etc.

Still a further object of my invention is to provide novel apparatus for and methods of drilling holes having a diameter of the order of 0.001 millimeter in times measurable in seconds.

Still another object of my invention is to provide novel apparatus for and methods of drilling holes utilizing the energy of an electron beam therefor.

Another object of my invention is to provide novel apparatus for and methods of concentrating an electron stream into a region of relatively high current density over a substantial length.

Still a further object of my invention is to provide a novel electron distribution at the source of electron image.

A still further object of my invention is to provide a novel electronic device having a first region in which an electron beam of substantially uniform intensity throughout its area and having a second region in which an image of the electron source is produced and in which second region focusing electrodes control the electron beam to form a predetermined shape of high current density.

Still a further object of my invention is to provide an electron system having an electron source in which the electron beam is of substantially uniform intensity in one region with means for reproducing the image of the source in a second region of a predetermined area and having electron rays of a predetermined angle with respect to the optical axis.

Still a further object of my invention is to provide an electron device for producing electrons of substantially uniform intensity throughout the area thereof and means in a second region for collecting electron rays at individual points in the plane from all of the rays having the same angle.

These and other objects of my invention will be more clearly understood in the description to follow made in connection with the drawings, in which:

Figure 1 is a vertical cross section of one form of the electron device used in my invention.

Figure 2 is an optical diagram of the general form obtained from an image of the electron stream produced in accordance with my invention.

Figure 3 is a special optical diagram of the system shown in Figure 2.

Figure 4 is an actual optical diagram showing the actual values of the optical system used in my invention.

Figure 5 is a reproduction of Figure 4 in which the horizontal dimensions have been magnified ten times for the purpose of clarifying the optical diagram.

Figure 6 is a magnification in all directions of the useful portions of the optical diagram of Figure 5.

Figure 7 is an optical diagram of the electron source including the portions which precede the optical diagram of Figures 2 or 3.

Figure 8 is a curve of current density distribution over the area of the electron source in which the abscissa is the distance at the electron source and the ordinate is the current distribution.

Figure 9 is a cross section of a portion of an electron device showing a modified form of my invention.

In the drawing, the electron gun 11' comprising a tubular housing made of any suitable metal is mounted on an insulator 12 with a suitable rubber ring washer 14. Mounted within the tubular housing 11' is a cathode 15 of any suitable electron emitting material such as tungsten. Leads 16 and 17 extending from the cathode are connected to any suitable source of direct current voltage supply such as battery 18 operating normally at a potential of four volts and supplying approximately four amperes.

Also mounted within the electron gun 11' in any suitable manner is a control electrode 19 having its upper portion 20 in the form of a cylinder and having an integral extension 21 of conical construction with an opening at its apex 22. A further integral extension 23 of the control electrode is cylindrical in shape.

The control electrode is connected over the conductor 24 to a potential source. The cathode is maintained at a potential of approximately —50,000 volts with respect to ground, and the control electrode is maintained over conductor 24 at a higher negative potential than the cathode by approximately 100 to 300 volts. These voltages may be suitably regulated in any well known manner.

It will be noted that the electron emitter 15 protrudes through the apex opening 22 of the conically shaped extension 21 of the control electrode 19. In practice, I have found that the cathode is preferably of hairpin shape having a wire diameter of 0.15 mm. For my purposes, I have found that the electron emitter should protrude beyond the opening 22 at the apex of the cone 21 by a distance substantially equal to the diameter of the wire for reasons which will be more clearly understood from the description which is to follow.

The cone section 21 of the control electrode may comprise preferably six conical sectors 25, insulated from each other. Each sector is maintained at a suitable potential between each other and the cathode of the order of 500 volts.

It will of course now be understood that the voltages of each of these sectors with respect to ground remain of the order of —50,000 volts.

To maintain these potential differences between the sectors, individual conductors corresponding to 24 are connected to each of the sectors 25 each having predetermined potentials applied thereto. Correspondingly, the cylindrical section 23 is also connected over its individual conductor corresponding to conductor 24 for applying a predetermined voltage thereto.

The cylindrical section 23 may be also formed of a plurality of sectors, insulated from each other and each maintained at suitable potentials with respect to each other.

In the present illustrations, however, the conical portions and the cylindrical portions are unitary members maintained at a common potential.

As will be seen, the cathode 15 protrudes beyond the conically shaped control electrode 21 by a distance equal to the diameter of the emitter wire. Adjacent to the electron emitter 15 there exists as is well known in the art, a space charge. The equipotential lines produced by the potential between the control electrode and anode assume the shapes shown by the lines 27, 27'.

It will be seen from Figure 1 that the equipotential lines follow the values of their adjacent electrodes.

The —50,000 volt equipotential line which is at the cathode or electron emitter potential follows generally the form of the cylindrical electrode 23 and the conical electrode 21. In Figure 1 the line closest to the cathode has a slight hump 27" adjacent the space charge zone at the cathode tip. The negatively charged electrons in the space charge zone are pulled out by this shape of the potential line. The equipotential lines thereafter rapidly straighten out this hump and assume complete convex forms as shown at 27$^a$. The curvature of these lines further away from the cathode become straight as at 27$^b$, and then concave as at 27$^c$.

Because these potential lines apply an accelerating force to the electrons in a direction normal to the potential, the electron beam is at first widened as at 32' and then accelerated onwardly slowly as at 32" by the potential lines 27$^c$ to produce a large distance to the focal plane.

It will of course be understood that the equipotential lines in Figure 1 necessarily are not shown in their true dimensions as this is not possible in illustrating the principal functions of these lines.

Preferably the cross section of the electron beam should be circular. This is determined by the shape of the cathode, the space charge adjacent thereto and the shape and potentials of the various conical sectors 25. If because of an unsymmetrical shape of the electron emitter, the cross sectional area of the electron stream in the first instance is elliptical, I have found that by a proper distribution of potentials applied to the individual conical sectors, I can reconstruct the cross sectional shape of the electron stream to restore it to a circle.

Thus for example, in the case of an original elliptically shaped electron stream, I would increase the relative potential of those sectors opposite the long axis of the conical shaped electron stream causing the long axis to be reduced. I also decrease the potential of the sectors opposite the small axis of the sectors which enlarges the small axis and restores the cross sectional circular shape of the electron stream. By the use of potential distributions between the sectors which are not chosen symmetrical to the optical axis, one can also secure deflections of the electron beam's direction.

It will, of course, be understood that in referring to an increase or decrease of potentials at the conical sectors, I am here referring to the relative voltages with respect to each other.

The diameter of the electron stream at its widest point for useful cases is between 0.5 to 1.5 mm. For the smaller diameter of electron stream, that is, 0.5 mm., the focal point of the electron stream will be approximately 10 cm. from the electron emitter, whereas for the electron stream having a diameter of 1.5 mm. the focal point will be 30 cm. from the emitter.

As the potential between the electron emitter and the control electrode increases, the diameter of the cross section through the electron stream adjacent the cathode decreases and the length to the focusing plane of the electron stream correspondingly decreases. As a result the current density increases until a critical point is reached. A further increase in the potential difference between the electron emitter and the control electrode withdraws the hump 27" from the space charge region and the current density decreases.

I have given below a table in which such relative values are set forth. It will be understood, however, that these values are not exactly reproduced but are given solely for purposes of illustration.

| Current Density | Anode | Cathode | Focus | Diam., mm. | Length, cm. |
|---|---|---|---|---|---|
| increase | 0 | —50,000 | —50,100 | 1.5 | 30 |
| Do | 0 | —50,000 | —50,200 | 1.0 | 20 |
| Do | 0 | —50,000 | —50,300 | 0.5 | 10 |
| decrease | 0 | —50,000 | —50,310 | 0.1 | 5 |
| Do | 0 | —50,000 | —50,315 | 0 | |

The anode 11 which is the lower end of the tubular member 11' is provided with an aperture 34 through which the electron beam 32 passes. Anode 11 is adjustably mounted on the base 36 by means of the adjusting screws 37 and 38 which permit adjustments of the anode 11 in an angular direction in a plane at right angles to the drawing. Correspondingly adjusting screws 41 and 42 permit an adjustment of the anode at any desired tilt in the plane of the drawing. In each of these adjustments, any desired number of adjusting screws may be employed.

Adjustment of the anode by the adjusting screws 41 and 42, may by the tilting action change the direction of the long axis of the electron beam to direct it as desired.

It will be noted that the anode 11 is grounded in any suitable manner as, for example, in the illustration here shown through the adjusting screws and to the grounded base member 43. The member 43 carries the entire electron gun through the adjusting screws and is provided with a rubber ring seal 45. The entire mechanism including the base 43 and the electron gun construction hereinafter described is evacuated in any suitable manner.

In Figure 2, I have shown a form of lens systems.

Assuming that the light source 311 is at a distance "$a$" from a lens 312; that the lens 312 is at a distance "$f$" from the focal plane 313, and that the image of the light source 314 is at a distance "$l_B$" from the focal plane 313, and finally that the light image 314 is at a distance "$b$" from the lens plane 312; then it will be noted that the rays 316 and 317 originating from the point 318 at the light source 311 meet on the point 321 of the image 314; correspondingly, the rays 322 and 323 originating from the point 324 of the light source 311 meet at the point 325 of the image 314. The diameter of the image 314 obviously now is determined first by the width of the light source 311 and also by the ratio of the distance "$a$" to the distance "$b$."

It will next be noted that the diameter of the focal plane 313 is determined by the angle which the ray 322 makes with the optical axis. A similar angle is formed by the ray 317 and the rays 316 and 323 also forming a corresponding angle but in the opposite direction. The ray 322 and ray 317 cross at the point 327 at the focal plane 313. The rays 323 and 316 cross at the focal point 328 on the plane 313.

It will now be observed that the diameter of the focal plane 313 is determined by the angle $\alpha$ and the ratio of the distance "$a$" to "$f$."

In the above discussion, the distance "$b$" and distance "$f$" were assumed to be predetermined. From the above, however, it will now be clear that the diameter of the focal plane 313 and the diameter of the image plane 314 are each determined by two individual sets of parameters and that the distance from the focal plane 313 to the image plane 314 are included in these relationships. That is to say, it is possible to change the diameter of the image plane 314 by either a change of the distance "$l_B$" or by a change in the diameter of the light source 311.

Similarly, the diameter of the focal plane 313 may be altered either by a change in the distance "$a$" or by a change in the angle $\alpha$. From the focal plane 313 to the image plane 314, all of the electron streams are confined within the space of the electron ray 317 and the electron ray 323.

In Figure 3 I have shown this same principle but now applied to a specific case. In this instance, I have used the same letters to identify corresponding distances as in Figure 2. Here again the light source plane 331 emits electron beams 332, 333, 334 and 335. The lens plane located at 337, a distance "$a$" from the light source 331, will cause the electron rays 333 and 335 to meet at the point 336 on the focal plane 337'. The lens also will cause the electron rays 334 and 332 to meet at the point 339 in the focal plane 337'. The electron rays 332 and 333 will meet at the point 341 in the image plane 342, and the electron rays 334 and 335 will meet at the point 343 in the image plane 342. Between the focal plane 337' and the image plane 342, all of the electron rays of the source 331 are concentrated between the rays 333 and 334.

Indeed it will be noted that the rays 333 and 334 in the specific example have become parallel from the lens plane 337 to the image plane 342 for the following reasons:

It will be noticed that in Figure 2, the focal plane 313 is positioned on the opposite side of the lens 312 not equal to the distance from the focal point 345 to the lens 312. Accordingly as is well known in optics, the rays 317 and 323 are not parallel. On the other hand, in Figure 3, the parameters have been so selected that the distance from the lens plane 337 to the focal point 346 is equal to the distance from the lens plane 337 to the focal plane 337'.

As now becomes clear from Figure 3, with a lens system 337 having a predetermined focal point 346, the distance from the focal point 346 to the focal plane 337' must be equal to double the distance from the lens 337 to the focal point 346 and that length is called, as is well known in the art, the focal length of the lens system 337.

From the description above, it will now be seen that I have discovered that I may successfully use an electron stream for cutting material in depth. In Figure 2, for example, which is the general case, I can cut from the plane at 313 to the plane at 314 cutting, however, a frustrated cone along the electron ray lines 317 and 323. In Figure 3 which is the more specific case, I can cut in depth from the plane at 337' to the plane at 342 forming a cylindrical hole whose circumferential edge is formed at 333 and 334.

In the following the equations for measuring the various values required in my optical system are set forth. Assuming that the depth of cut which I have marked "$l_B$" is known, which is the distance from the plane 313 to 314, Figure 2, and that the distance "$d_G$" which is the diameter at the end of the cut between 321 and 325 is known and that "$d_A$" which is the diameter between 327 and 328 and finally that the focal length "$f$" from the plane "$d_A$" to the lens is known, then as will be obvious $$b = f + l_B \tag{1}$$

If the vertical line which forms the angle $\alpha$ is extended to "$d_G$," the side opposite the angle $\alpha$ will be equal to $\frac{1}{2}(d_G - d_A)$.

Then $$\tan \alpha = \frac{1}{2}\frac{d_G - d_A}{l_B} \tag{2}$$

If a line is extended from the point 325 normal to the line of "$d_A$" this line will intersect "$d_A$" at a distance from the point 328 equal to $\frac{1}{2}(d_G - d_A)$. The angle formed at 325 will then be equal to $(2\beta + \alpha)$. The relationship between these angles may then in accordance with standard trigonometry be related as follows:

$$\tan 2\beta = \frac{d_G + d_A - \tan \gamma \cdot 2l_B}{2l_B + (d_G + d_A) \tan \gamma} \tag{3}$$

From Equation 3 I can now derive the following equation $$d_Q = \tan 2\beta \cdot b - (d_A - 2 \tan \gamma \cdot f) \tag{4}$$

In accordance with standard optical laws $$a = b\frac{d_Q}{d_G} \tag{5}$$

In Equation 4, the value for "$d_Q$" has been derived and "$d_G$" was given and the value for "$b$" was shown in Equation 1. Accordingly, I can now evaluate my value "$a$." Again in accordance with standard optical laws, $$\tan 2\alpha = \frac{b}{a} \cdot \tan 2\beta \tag{6}$$

In this equation $b$ was found in Equation 1, "$a$" has now been found from Equation 5 and tangent $2\beta$ has been found from Equation 3, and accordingly the angle $\alpha$ can now be determined.

In the above I have assumed a known value for "$f$." I could in the alternative have derived the desired parameters if instead of assuming a known value for "$f$," I had assumed a known value for $\alpha$ in which case I would have derived a value for "$f$." That is to say, if I know the value "$f$" then I can calculate the value of "$a$" and the angle $\alpha$. I can, on the other hand, in place of knowing the value "$f$," if I knew the value of angle $\alpha$, calculate the disance "$f$." Also it will be observed that by changing the values of "$d_A$" I may change the angle $\alpha$ if the other values are maintained constant. Or, conversely, by changing "$d_A$" and correspondingly changing "$f$," I can maintain the angle $\alpha$ constant.

By obeying the laws set forth in the above equations, I can obtain sufficient electron volt energy from the plane "$d_A$" to "$d_B$" to drill a conical hole.

In the following, I have taken these general equations and applied them to a specific case. Assuming now in connection with Figure 3 that the values of "$l_B$" "$d_B$" and "$f$" are known, then:

$$d_B = d_G = d_A \tag{7}$$

the "$d_G$" and "$d_A$" being the planes shown in Figure 2. This condition obtains because the electron stream is formed with parallel rays 333 and 334 in Figure 3 so that the distance in the plane from 336 to 339 equals the distance from 341 to 343.

Then it follows that:

$$\tan \gamma \text{ of Figure } 3 = 0 \tag{8}$$

Inserting different value of tan $\gamma$ into Equation 3 it follows that $$\tan 2\beta = \frac{d_B}{l_B} \tag{9}$$

Now inserting the value of tan $2\beta$ in Equation 4, we derive $$d_Q = \tan 2\beta \cdot b - d_B \tag{10}$$

I now have the necessary values for deriving "$a$" and angle $\alpha$ in Equations 5 and 6. In applying the above optical laws to a specific case I took the following values:

$l_B = 1$ mm.
$d_B$ and $d_G$ and $d_A = 0.1$ mm., and
$f = 15$ mm.

Then from Equation 9 I found $$\tan 2\beta = \frac{d_B}{lb} = \frac{0.1}{1} = 0.1$$

From Equation 2

$b = f + l_B = 16$ mm.
$d_Q$ (derived from Equation 10) $= \tan 2\beta \cdot b - d_B = 1.6 - 0.1 = 1.5$ mm.

"$a$," as can now be determined from Equation 5 equals $$\frac{16 \cdot 1.5}{0.1} = 240 \text{ mm.}$$

$\tan 2\alpha$ derived from equation 6 equals $\frac{16}{240} \cdot 0.1 = 0.0067$ In Figure 4 I have attempted to show in actual dimensions the electron optical system of the above specific example. In view of the fact that the lines tend to merge in this figure, I have shown in Figure 5 a similar optical system in which the long dimension has been retained, but the transverse dimensions have been increased by 100 and in Figure 6 I have shown the region "$l_B$" enlarged in all dimensions 100 times.

The actual apparatus for achieving the optical system and the cutting results I seek are disclosed in Figure 1.

In Figure 7 I have shown a completed optical system in accordance with my invention as applied in practice. This is the optical system obtained in the physical embodiment of one form of my invention as shown in Figure 1.

Referring therefore now to Figures 7 and 1 as pointed out hereinabove, the electron beam emitted by my novel arrangement of electron emitter results in an electron beam in which there is a substantially constant electron intensity over the entire area as distinguished from the substantial reduction at the fringe or outer circumferential edges as heretofore achieved. This is illustrated in the characteristic curve of Figure 8 in which the abscissa is the distance or diameter of the electron source and the ordinate is the electron current density. As shown in this characteristic curve, a relatively sharp or high gradient is obtained. Thus as will appear hereinafter, when the fringe or circumferential edges of the electron beam is cut off substantially little or none of the electron energy is lost. This electron stream is now directed towards a diaphragm 111 which comprises a tungsten disk mounted between two members 112 and 113, member 112 in turn being mounted on a base 114 and by means of screw members 115 being adjustable in a horizontal plane in the manner described hereinabove.

The diaphragm 111 is provided with an opening at its center 117 through which the electron beam will pass. This opening 117 is illustrated in Figure 7 between the schematically shown diaphragm member 111. In the present description I refer to this particular diaphragm as being at the angle or focusing plane. It is the plane which may be the plane of highest current density and corresponds to the plane which I selected for the vaporizing of material in my copending application.

The electron stream passing through the opening 117 is directed towards a second diaphragm 121 of similar construction and consisting of an outer plate 122 and an inner plate 123 between which is held the diaphragm 121. Diaphragm 121 is provided with an opening 124 at its center through which the electron stream passes. As in the first example, this diaphragm is adjustably mounted by means of screw members 125. The opening 124 shown in Figure 1 corresponds to the opening shown in Figure 7 and is hereinafter defined as mounted in the image plane. The current density may be maximum either at the focusing plane at 117 or at the image plane 124 depending upon which of these presents the smaller area. In the present illustration I have chosen my values such that the maximum current density is obtained at the image plane 124 and as stated in connection with my copending application for the purpose of vaporizing metal, I may use either of these two planes or any plane intermediate thereof.

The angle $\alpha$ formed between the lines 127 and 128 is determined by the construction of my electron emitter and the potentials of the control electrode and by the diameter of the opening 117 in the focusing plane.

Accordingly, after I have determined the required value of $\alpha$ as hereinabove recited, I may make adjustments of the diaphragm opening 117 to provide the required angle $\alpha$. The diameter of the opening 124 which is the second value determined in the above calculations may in turn be obtained by adjustments of the diaphragm opening 124. With these values now set and the remaining dimensions already determined, I have a predictable electron stream.

The electron stream after passing through the diaphragm opening 124 is now subjected to an electromagnetic field or lens system or electron lens system comprising an electromagnet 131 which consists of a winding 132 energized over conductors 133 from any suitable source of direct current. An electromagnetic path is provided by the iron pole members 134 extending over the iron path 135 through an air gap 136, iron 137, and 138 back to 134.

This lens system is shown in the optical system of Figure 7 at 131 and functions as there illustrated to produce the parallel electron rays shown at 141 and the converging rays 142 and all rays in between.

The electromagnet 131 is mounted on a housing 146 which may be of metal such as iron and which carries within it a base member 147. The base member 147 in turn supports a carriage 148 having a rail member 149 operating in a track 150 in the base member 147. Supported upon the carriage 148 is a second carriage 151 which carries a screw member 152 protruding through the walls of the housing 146 and having at its outer end a rotatable handle 153.

Rotation of the handle 153 will turn the screw 152 which in turn operates the carriage member 151 in a rail construction provided between the carriage 151 and 148 for adjustment of the carriage 151 in a direction normal to the adjustable movement of the carriage 148. By this means the work member 155 mounted on the carriage 151 may be positioned in any desired position with respect to the incoming electron beam.

The adjustment of the carriage 148 is achieved by means of a screw member 157 corresponding in operation to that of screw member 152 and attached to the carriage 148 and operable from a point exterior of the housing to provide the required adjustment.

In order to facilitate evacuation of the electron system, a tubular connection 161 is provided between the interior of the housing 146 and the electron chamber 162. For further ease in evacuation, openings 163 and 164 are provided between successive chamber sections in the electron opening 162.

In the particular illustration of my invention, I may drill holes in a plate 155 which consists of tungsten or glass or porcelain or palladium silver alloys and indeed almost any desired material of any hardness. These holes may be of a diameter between 0.1 and 0.001 mm. and having a length of between 3 mm. to 0.1 mm. in a period of time from 1 sec. to 20 sec. If desired, plate 155 can be constructed to be movable with respect to the beam or the beam may be moved, by appropriate sweeping means, with respect to the plate 155 to thereby make slots or cuts of any desired form. In the construction of such holes, metal vapor will be produced and provision must be made for the proper removal thereof from time to time. Moreover in the production of these holes in large quantities, it is necessary to arrange the work piece 155 in its proper position as, for example, between planes "$d_A$" and "$d_G$," Figure 2.

This I achieve by the use of a microscope which is so arranged and which is provided with reflecting mirrors so that it makes visible to the operator the work material through which the holes are to be made. With the help of the microscope, I can observe the unit area on the work material by the use of suitable mirrors and windows on which the electron beam impinges.

In order to enable removal and replacement of the carriages and major parts of the mechanism, I have provided a door 361 which is provided with suitable seals as at 362 and secured to the walls 146 of the chamber.

A smaller door is provided at 363 also having suitable sealing means at 364. When door 363 is opened, I can reach in for making adjustments and also can remove the work material 155.

In Figure 9 I have shown a modified form of my invention. The electronic and optical system will be similar to that shown in the previous embodiment of my invention. The focusing electromagnet 131 corresponding to that shown in Figure 1 is in the relatively same position for focusing the electron beam 201 as in the previously described system onto a work material 202. In the present example, it will be assumed that the work material is a diamond in which a hole is to be drilled.

In attempting to drill holes in diamonds, I have found that the temperatures to which my electron stream raises the diamond is of the order of 3000° C. But diamonds even at temperatures of the order of 2000° C. tend to disintegrate into graphite. I accordingly have found, that I can achieve the required drilling by a chemical reaction. To this end, I admit oxygen into the area where the electron stream impinges upon the diamond. In this case, I control the electron stream as described hereinabove to a lesser intensity and raise the temperature of the diamond only to a temperature of the order of 300° C.

At this temperature, the carbon in the diamond will combine with the oxygen to form $CO_2$ or CO. In effect, therefore, I burn away the diamond to form the minute hole therein as desired.

The diamond 202 is mounted on a carriage 203 in a housing 204 which may be substantially the same as that described in the previous embodiments. Oxygen from a tank 205 connected over the passageway 206 and through an adjustable valve mechanism 207 adjustably controlled by the handle 208 admits varying amounts of oxygen to a second passageway 209 which opens into the passage 211 within the chamber 204.

At 212 a passageway to an evacuated pump is provided. The space 211 is connected through an opening 213 to a second chamber 214 which is connected through a line 215 to an evacuating pump.

The electron beam 201 is admitted into chamber 214 through a passageway 216.

The first pump connected to passage 212 draws off the gas in the chamber 211 to keep the pressure therein as low as possible. However, some of the gas will escape through the opening 213 into the chamber 214. The second pump connected to the line 215 will draw off gases which enter the chamber 214. Some gas may still escape through the passageway 216 into the vacuum region but this amount of gas will be relatively negligible.

For proper operation, the vacuum chamber of the electron beam 201 must be maintained at as high a vacuum as is possible. Moreover as will now be understood, it is possible to further reduce any gas escaping into the evacuated regions by providing a succession of chambers such as 214 each connected to evacuating pumps.

When the electron beam enters the chamber 214, any gas therein would normally tend to diffract the electron beam by collisions with the gas particles. In order to prevent such diffraction, the distance from the opening 216 to the opening 213 must be kept smaller than the free mean path of the particular gas employed such, for example, as oxygen, in the particular illustration. The free mean path is a function of the pressure, the particular gas employed and the velocity of the electrons. At the velocity of the electrons produced by 50,000 electron volts as herein provided and using oxygen at a pressure in chamber 214 of 0.01 millimeters of mercury, the distance from the opening 216 to the opening 213 should be of the order of one centimeter.

With the oxygen in the chamber 211 at a pressure of one millimeter to 0.1 millimeter mercury, the distance from the opening 213 to the unit area on the diamond 202 should be one mm. The evacuated chamber should be kept at a vacuum of 0.0001 or less millimeter mercury.

With this construction, the electrons will maintain the unit area on the diamond at a temperature of the order of 300° C. and at this temperature the oxygen will combine with the carbon at this unit area to form $CO_2$ which as described above is then drawn off. The surrounding areas of the diamond are kept practically cool since any heat generated is drawn off almost as fast as it is produced at the unit area and does not succeed in conduction to the surrounding areas.

As will now be understood, it is possible to use atmospheric pressure within the chamber 211. In such a case it would be necessary to have a higher rate of pumping at 215 and possibly a larger number of chambers corresponding to the chamber 214, one above the other and interposed between the electron stream and the work material. It would then also be necessary to readjust the distances between successive openings to correspond to the free mean path of the new gas and its new pressure at the velocity corresponding to the electron volts employed.

It will further be understood that the velocity of the electrons may also be changed by a change in the electron volts to vary the free mean path.

Although I have in the present invention illustrated the optical system using an electromagnet 131, it will be obvious from the description hereinabove that it is also possible to drill holes in a system which did not use such a lens. For example, in Figure 7 there is a substantial concentration of electron beam between the diaphragm openings 117 and 124 and openings could therefore be drilled in this section. However, the most desirable or maximum current density is achieved by the use of a lens which enables a concentration to a smaller diameter of area as shown at the section between the planes "$d_A$" and "$d_G$" in Figure 2 or between "$d_A$" and "$d_B$" of Figure 3 or between "$d_A$" and "$d_B$" in Figure 6.

Moreover, although I prefer the use of an electromagnetic means as my optical lens, I may employ electrostatic lenses.

In the present illustration of my invention I have chosen a novel electron emitter arrangement with a control electrode so positioned with respect to the electron emitter and so shaped and having such a potential that a more desirable electron beam shape is obtained. However, it will now be understood from the above description that once I have obtained an image of the electron emitter, as, for example, at "$d_A$," Figure 2, and have obtained the required angle α, the optical system shown in Figure 2 or in Figure 3 will provide the required current density to produce the desired drilling.

Accordingly, I am not bound by my specific original source of electron emitter so long as I obtain from any source the required image of the electron emitter as at $d_Q$ and the required angle of electron such as α. However, the electron density distribution is preferably of substantially uniform form so that only a minimum of energy is lost by means of adjustment of the diaphragm.

In the above I have described one embodiment of my invention in which the energy of electrons are employed for drilling. It will be apparent to those skilled in the art that the same principles may be employed in a gaseous tube utilizing ions instead of an evacuated vessel and the use of electrons.

In the latter case, modifications of my system would be required because of the greater mass of the ions. Accordingly the diaphragm structures would have to be modified because of the cathode effects thereon and I would replace the electromagnetic lens by an electrostatic lens.

It will also be obvious from the above description that I am not confined to the construction of a hole having circular cross sections. By a proper distribution of potentials applied to the slotted control electrode I may produce an electron shape at the emitter of any desired form. By a correspondingly shaped opening at the diaphragm openings 117 and 124 which will permit the irregularly shaped electron stream to pass, I can produce drillings of such irregular shapes.

Although I have in the above described system illustrated my invention using 50,000 electron volts, it will be understood that improved operations can be obtained with simpler mechanism if increased electron volts are employed.

I claim:

1. An electron system comprising an electron emitter, means for accelerating the electrons to a relatively high velocity, a control electrode adjacent said electron emitter and means at said electron emitter for causing the electrons adjacent said emitter to diverge and thereafter converge to a focus at a remote point from said emitter and second focusing means for recollecting said electrons into a cylindrical region of increased current intensity having a length of the order of 5 millimeters and having a diameter of the order of 0.1 millimeter to drill cylindrical holes having a length of from 5 millimeters to 0.3 millimeter and having a diameter of from 0.1 to 0.001 millimeter.

2. In an electron system for drilling holes, an electron emitter, a control electrode of conical construction surrounding said electron emitter and having an aperture at its apex, said control electrode being slotted to form a plurality of sectors, means for applying individual potentials to each of said sectors, said electron emitter protruding through said aperture, the conical shape of said control electrode and the potential applied thereto causing the electrical field produced by said control electrode to have convex curvature looking towards the electron emitter to produce a substantially uniform distribution of the electrons and to have a relatively long focal distance, an anode electrode of high potential with respect to said electron emitter of the order of 50,000 volts, a supporting member for carrying said electrodes and defining electron regions for said electrodes, adjustable means for adjusting the position of said anode with respect to said supporting means, a first diaphragm mounted in the path of said electron beam, and at the focusing plane for collecting at individual points along the plane thereof all of the electrons of the same angle, a second diaphragm in the path of said electron stream and at the image plane for reproducing thereat an image of the electrons at the electron source, means for adjusting each of said diaphragms to control the area of the electron image at the second diaphragm and the angle of the electron image thereat, a focusing magnetic coil adjacent said electron stream for focusing in a focus region said electron stream into a beam of parallel rays and having a diameter of between 0.1 to 0.001 millimeter and having a length of from five millimeters to 0.3 millimeter, a chamber, a carriage mounted in said chamber for carrying a work member in which holes are to be drilled, said work member being located in said focus region, means for adjusting said carriage to predetermine the positioning of said work member and connecting means between said chamber and said electron regions and an evacuating means connected to said chamber for maintaining a vacuum in said electron regions.

3. In an electron system for drilling holes, an electron emitter, an anode electrode, a control electrode of conical construction surrounding said electron emitter and having an aperture at its apex, said control electrode comprising a plurality of conical sectors, means for applying individual potentials to each of said sectors, said electron emitter protruding through said aperture, the conical construction of said control electrode and the potential applied thereto causing the electrical field produced by said control electrode to have a convex curvature looking towards the electron emitter from said anode, and to produce a substantially uniform distribution of the electrons having a relatively long focal distance to a first focal plane, means for applying a high potential between said anode and said electron emitter of the order of 50,000 volts, a supporting member for carrying said electrodes and defining electron regions for said electrons, adjustable means for adjusting the position of said anode with respect to said supporting means, a first diaphragm mounted in the path of said electron beam and at the focal plane for collecting at individual points along the plane thereof all of the electrons of the same angle, a second diaphragm in the path of said electron stream and at the image plane for reproducing thereat an image of the electrons at the electron source, means for adjusting each of said diaphragms to control the area of the electron image at the second diaphragm and the angle of the electron image thereat, a focusing magnetic coil adjacent said electron stream for focusing said electron stream into a focal region in which the electron beam is in the form of parallel rays having a diameter of between 0.1 to 0.001 millimeter and having a length of from 5 to 0.3 mm., a chamber, a carriage mounted in said chamber for carrying a work member in which holes are to be drilled, means for connecting said chamber and said electron source, means for adjusting said carriage to position said work member in said focal region, and an evacuating means connected to said chamber for maintaining a vacuum in said electron regions.

4. In an electron system for drilling holes, an electron emitter, an anode electrode, a control electrode of conical construction surrounding said electron emitter and having an aperture at its apex, said construction of electron emitter, said conical shape of said control electrode and the potential applied thereto producing a substantially uniform distribution of the electrons having a relatively long focal distance to a first focal plane, means for applying a high potential between said anode and said electron emitter of the order of 50,000 volts, a supporting member for carrying said electrodes and defining electron regions for said electrons, adjustable means for adjusting the position of said anode with respect to said supporting means, a first diaphragm mounted in the path of said electron beam and at the focal plane for collecting at individual points along the plane thereof all of the electrons of the same angle, a second diaphragm in the path of said electron stream and at the image plane for reproducing thereat an image of the electrons at the electron source, means for adjusting each of said diaphragms to control the area of the electron image at the second diaphragm and the angle of the electron image thereat, a focusing magnetic coil adjacent said electron stream for focusing said electron stream into a focal region in which the electron beam is in the form of parallel rays having a diameter of between 0.1 to 0.001 millimeter and having a length of from 5 to 0.3 mm., a chamber, a carriage mounted in said chamber for carrying a work member in which holes are to be drilled, means for connecting said chamber and said electron source, means for adjusting said carriage to position said work member in said focal region, and an evacuating means connected to said chamber for maintaining a vacuum in said electron regions.

5. In an electron system for drilling holes, an electron emitter, an anode electrode, a control electrode of conical construction surrounding said electron emitter and having an aperture at its apex, said construction of electron emitter, said conical shape of said control electrode and the potential applied thereto producing a substantially uniform distribution of the electrons having a relatively long focal distance to a first focal plane, means for applying a high potential between said anode and said electron emitter of the order of 50,000 volts, a supporting member for carrying said electrodes and defining electron regions for said electrons, a first diaphragm mounted in the path of said electron beam and at the focal plane for collecting at individual points along the plane thereof all of the electrons of the same angle, a second diaphragm in the path of said electron stream and at the image plane for reproducing thereat an image of the electrons at the electron source, means for adjusting each of said diaphragms to control the area of the electron image at the second diaphragm and the angle of the electron image thereat, a focusing magnetic coil adjacent said electron stream for focusing said electron stream into a focal region in which the electron beam is in the form of parallel rays having a diameter of between 0.1 to 0.001 millimeter and having a length of from 5 to 0.3 mm., a chamber, a carriage mounted in said chamber for carrying a work member in which holes are to be drilled, means for connecting said chamber and said electron source, means for adjusting said carriage to position said work member in said focal region, and an evacuating means connected to said chamber for maintaining a vacuum in said electron regions.

6. An electron system, comprising an electron emitter, means for energizing electrons from said electron emitter to a value of the order of 50,000 electron volts and higher a control electrode adjacent said electron emitter and means at said emitter including said control electrode and said emitter for causing the electrons adjacent said emitter to diverge and thereafter converge to a focus at a remote point from said source, a second focusing means for collecting said electrons into a cylindrical region of increased current intensity, and means for placing a member in said region for receiving a transfer of the energy therefrom to drill holes in said member.

7. An electron system, comprising an electron emitter, means for energizing electrons from said electron emitter to a value of the order of 50,000 electron volts and higher a control electrode of conical construction surrounding said electron emitter and having an aperture on its apex, said electron emitter protruding through said aperture, the conical shape of said control electrode and the potential applied thereto causing the electrical field produced by said control electrode to have a focus curvature looking towards the electron emitter to produce a substantially uniform distribution of the electrons and to have a relatively long focal distance, an anode having a high potential with respect to said electron emitter of the order of 50,000 volts, focusing means collecting the electrons emitted from said electron emitter into a cylindrical region of increased current intensity, and means for placing a member in said region for receiving a transfer of the energy therefrom to drill holes in said member.

8. An electron system comprising a first region, an electron emitter and focusing means in said first region, means for energizing electrons from said electron emitter to a value of the order of 50,000 electron volts and higher, said focusing means being adjacent said electron emitter and causing the electrons emitted by said electron emitter and adjacent said emitter to diverge and thereafter converge to a focus at a point remote from said electron emitter a second region, the said focus being located within said second region, said second region being immediately adjacent said first region and means including a focusing coil in said second region for concentrating the electron beam from said emitter into a confined cylindrical region and means for placing a member in said region for receiving a transfer of the energy therefrom to drill holes in said member.

9. In an electron gun, a source of electrons, means for moving said electrons in a given direction and a control electrode surrounding said source of electrons; said control electrode being connectible to a source of control potential; said control electrode being constructed to produce equipotential surfaces shaped for first diverging said electrons emitted from said source of electrons and thereafter converging said electrons emitted from said source of electrons to a focus at a point removed from said control electrode; said divergence and said convergence being accomplished within the boundaries of said control electrode, and means for positioning a work member at a point substantially at said focus of said electron beam; the concentrated energy of said electron beam drilling a hole in said work member.

10. In an electron gun, a source of electrons, means for moving said electrons in a given direction and a control electrode surrounding said source of electrons; said control electrode being connectible to a source of control potential; said control electrode being constructed to produce equipotential surfaces shaped for first diverging said electrons emitted from said source of electrons and thereafter converging said electrons emitted from said source of electrons to a focus at a point removed from said control electrode; said divergence and said convergence being accomplished within the boundaries of said control electrode; and means for positioning a work member at a point substantially at or in front of said focus of said electron beam; the concentrated energy of said electron beam drilling a conical hole in said work member.

11. In an electron system; an electron emitter, control electrode means for focusing a beam of electrons emitted from said electron emitter at a point removed from said emitter, and a focusing means; said focusing means being constructed to recollect said focused electrons into a cylindrical region of increased current density; means for positioning a work member at said cylindrical region; the energy of said electron beam in said cylindrical region drilling a cylindrical hole in said work member.

12. In an electron gun, a source of electrons, means for moving said electrons in a given direction and a control electrode surrounding said source of electrons; said control electrode being connectible to a source of control potential; said control electrode being constructed to produce equipotential surfaces shaped for first diverging said electrons emitted from said source of electrons and thereafter converging said electrons emitted from said source of electrons to a focus at a point removed from said control electrode; said divergence and said convergence being accomplished within the boundaries of said control electrode, and means for positioning a work member at a point substantially at said focus of said electron beam; the concentrated energy of said electron beam drilling a hole in said work member; said control electrode being further constructed of a plurality of angularly spaced segments individually connectible to sources of control potential; said sources of control potential being adjustable for adjusting the shape of said equipotential surface to thereby control the cross-sectional shape of the beam of said electrons.

References Cited in the file of this patent

UNITED STATES PATENTS

| | | |
|---|---|---|
| 1,864,591 | Foster | June 28, 1932 |
| 2,060,610 | Cox | Nov. 10, 1936 |
| 2,128,581 | Gardner | Aug. 30, 1938 |
| 2,267,714 | Borries et al. | Dec. 30, 1941 |
| 2,267,752 | Ruska et al. | Dec. 30, 1941 |
| 2,345,080 | Von Ardenne | Mar. 28, 1944 |